United States Patent [19]
Ohue

[11] Patent Number: 4,928,272
[45] Date of Patent: May 22, 1990

[54] TWO-WAY CATV SYSTEM USING FREQUENCY DIVISION MULTIPLEXING

[75] Inventor: Hiroshi Ohue, Osaka, Japan

[73] Assignee: Matsushita Electric Industrial Co., Ltd., Osaka, Japan

[21] Appl. No.: 353,559

[22] Filed: May 18, 1989

[30] Foreign Application Priority Data

May 23, 1988 [JP] Japan ................................. 63-125248
Jul. 18, 1988 [JP] Japan ................................. 63-178605

[51] Int. Cl.$^5$ ................................................ H04J 4/00
[52] U.S. Cl. ...................................... 370/50; 370/70; 358/142
[58] Field of Search ................... 370/50, 70; 358/142, 358/155

[56] References Cited

U.S. PATENT DOCUMENTS 4,013,842 3/1977 Kao et al. .............................. 370/50
4,075,429 2/1978 Takahata et al. ...................... 370/70
4,513,315 4/1985 Dekker et al. ........................ 370/50

Primary Examiner—Douglas W. Olms
Assistant Examiner—Christopher O. Edwards
Attorney, Agent, or Firm—Stevens, Davis, Miller & Mosher

[57] ABSTRACT

A two-way CATV system, in which a plurality of communication channels are set simultaneously in an upstream communication line between a plurality of end terminal equipment and a center equipment by using frequency division multiplexing, is disclosed. A digital transmultiplexer is arranged at each junction between a trunk line and a branch line for converting a frequency division multiplex signal into a time division multiplex signal. Frequency division multiplex signals from the terminal equipment are converted into time division multiplex signals, and then only a time slot corresponding to a frequency slot containing a signal therein is picked up to thereby prevent upstream noises from flowing into the trunk line.

9 Claims, 8 Drawing Sheets

⇓
DETECTION OF f1

⇓
DETECTION OF f0, f3

(2-1)

(2-2)

(6-1) FREQUENCY DIVISION MULTIPLEX SIGNAL OF BRANCH LINE 520

(6-2) FREQUENCY DIVISION MULTIPLEX SIGNAL OF BRANCH LINE 521

(6-3) TIME DIVISION MULTIPLEX SIGNAL AFTER TDM CONVERSION (6-4) TIME DIVISION MULTIPLEX SIGNAL AFTER TDM CONVERSION (6-5) TIME DIVISION MULTIPLEX SIGNALS ON TRUNK LINE 550

(6-6) FREQUENCY DIVISION MULTIPLEX SIGNALS AT INPUTS TO CENTER UNITS 501 TO 503

(7-1)
OUTPUT SIGNAL
FROM TERMINALS (7-2)
TIME DIVISION MULTIPLEX
SIGNALS ON TRUNK LINE (7-3)
INPUT SIGNAL TO
CENTER UNITS

TWO-WAY CATV SYSTEM USING FREQUENCY DIVISION MULTIPLEXING

BACKGROUND OF THE INVENTION

1. Field of the Invention

The present invention relates to a two-way CATV system for setting a plurality of communication channels in an upstream communication line to a central equipment (hereinafter referred to simply as a center) from a plurality of end terminal equipment (hereinafter referred to simply as terminals) by means of frequency division multiplexing.

2. Description of the Related Art

In conventional two-way CATV systems with communication channels arranged between terminals and a center unit, in order to reduce upstream noises in an upstream communication line, a plurality of switches called bridger gates 810 and 870 and so on adapted for turning on and off in response to instructions from the center unit are disposed in the vicinity of branching points or junctions 850, 840 and so on between a trunk line 830 and branch lines 820, 821 and so on, so that only a bridger gate belonging to a branch line having a terminal transmitting a signal is closed in compliance with an instruction from the center unit, while bridger gates associated with the branch lines having no terminal transmitting a signal are kept open thereby to prevent noises from flowing into the trunk line from any branch line having no terminal which transmits a signal. In FIG. 8, assume that only a terminal 861 is transmitting an upstream signal, while terminal 862 and other terminals are not transmitting any upstream signal. A center unit 800 controls the bridger gates 810, 870 and so on, and closes the bridger gate 810 alone, while keeping the other bridger gates including 870 open. Then, only a signal of the branch line 820 associated with the terminal 861 is transmitted to the trunk line, while the signals of the other branch lines 821 and so on are prevented from entering the trunk line, thereby eliminating upstream noises.

This conventional system for eliminating the upstream noises operates to eliminate such noises effectively in the case where there is only one concurrent communication channel in the upstream communication line and therefore only one bridger gate is open at the same time. Nevertheless, there are many cases in which an upstream communication line is used in frequency division multiplexing with a plurality of communication channels set at a time.

In such a case, if communication channels are set at the same time between terminals associated with different branch lines and a center unit (for example, between a terminal 861 associated with a branch line 820 and a center unit 800, and between a terminal 862 associated with a branch line 821 and the center unit 800 in FIG. 8, independently and at the same time), a plurality of bridger gates would be closed at the same time (in the cited example, the bridger gates 810 and 870 are closed at the same time), with a result that noises from a plurality of branch lines would flow into the trunk line, thereby making it impossible to eliminate noises completely.

This problem is aggravated with an increase in the number of frequency multiplexing carrier waves and an increase in the number of communication channels set at the same time.

SUMMARY OF THE INVENTION

An object of the present invention is to eliminate upstream noises effectively when a multiplicity (several tens to several hundreds) of communication channels of a comparatively narrow bandwidth (several hundred kHz) are set in an upstream communication line by frequency division multiplexing with carriers arranged equidistantly for a two-way CATV system.

In order to achieve the above-mentioned object, there is provided according to the present invention a two-way CATV system with a plurality of communication channels set by using frequency division multiplexing in an upstream communication line leading to a center from a plurality of terminals, wherein the communication line includes a trunk line connected to the center and a plurality of branch lines branching from the trunk line, and the CATV system further comprises filter means including a first digital transmultiplexer for converting a frequency division multiplex signal from the terminals into a time division multiplex signal, and means for sending out only a time slot corresponding to a frequency slot containing a signal to the trunk line after the conversion of a frequency division multiple signal from a terminal into a time division multiplex signal. In short, noises in the branch lines are prevented from flowing into the trunk line by taking out only a time slot containing a signal in each branch line.

According to another aspect of the present invention, there is provided a two-way CATV system wherein the upstream signal on the trunk line is transmitted by using analog frequency division multiplexing, and the CATV system further comprises filter means including a first digital transmultiplexer for converting a frequency division multiplex signal from a terminal to a time division multiplex signal and a second digital transmultiplexer for converting a time division multiplex signal into a frequency division multiplex signal, and means for replacing a time slot containing no signal with zero after the conversion of a frequency division multiplex signal from a terminal into a time division multiplex signal by the first digital transmultiplexer, restoring the time division multiplex signal thus replaced into a frequency division multiplex signal again by the second digital transmultiplexer, and transmitting the frequency division multiplex signal thus restored to the trunk line. In short, a frequency division multiplex signal is transmitted to the trunk line from each branch line, thereby preventing noises from flowing into the trunk.

DESCRIPTION OF THE PREFERRED EMBODIMENTS

In a two-way CATV system according to the present invention, a plurality of communication channels are set at the same time in an upstream communication line leading to a center from a plurality of terminals by using frequency division multiplexing.

Figure 1:
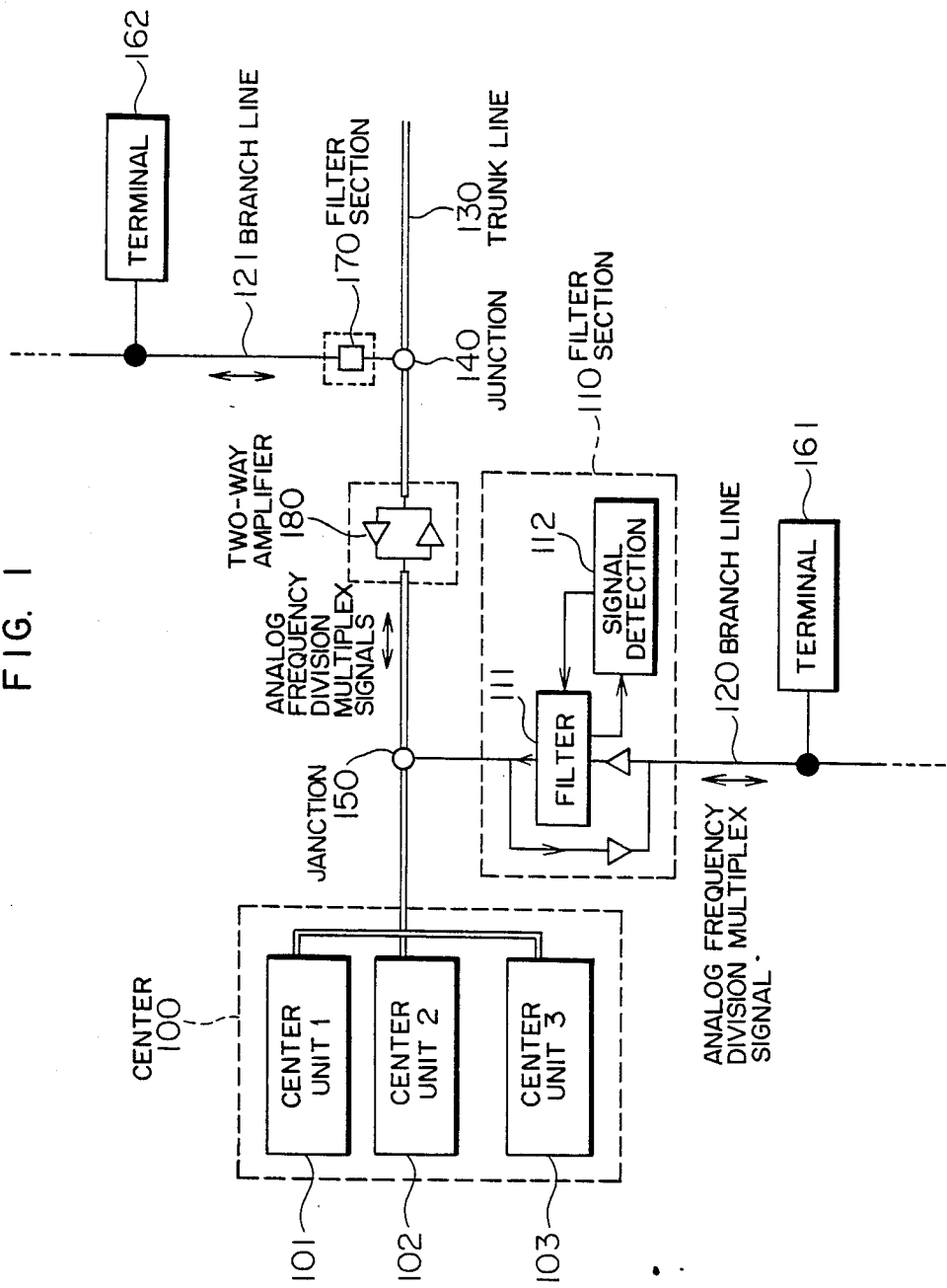
FIG. 1 is a block diagram showing a general configuration of a first embodiment of the present invention.

A general configuration of a first embodiment of the present invention is shown in the block diagram of FIG. 1.

In FIG. 1, reference numeral 100 designates a center, numeral 130 a trunk network, numerals 120 and 121 branch lines connected to the trunk line 130 at junctions 150 and 140, numerals 161 and 162 terminals connected to the branch lines 120 and 121, respectively, numerals 110 and 170 filter sections associated with the branch lines 120 and 121, respectively, and numeral 180 a two-way amplifier inserted in the trunk line.

The center 100 includes center units 101, 102 and 103, and the filter section 110 includes a signal detector 112 and a filter 111.

The communication line includes the trunk line 130 connected to the center 100 and the branch lines 120, 121 and so on branching from the trunk line 130.

The number of branch lines 120, 121 and so on branching from the trunk line 130 is, say, 10 to 20. The number of the terminals connected to respective branch lines 120, 121 and so on, on the other hand, is, say, 100 to 500.

The junction 140, 150 and so on are junctions connecting the trunk line 130 with the branch lines 120, 121 and so on. An upstream signal transmitted on each branch line 120, 121 and so on and the trunk line 130 is communicated by using analog frequency division multiplexing.

A coaxial cable is used, for example, as a communication line having a transmission bandwidth of about 300 MHz. This transmission band is divided into an upstream communication band (0 to 50 MHz) and a downstream communication band (60 to 300 MHz).

Figure 2:
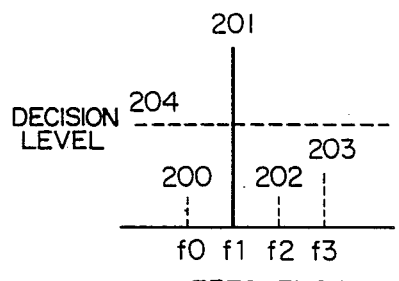
FIG. 2 is a diagram for explaining the operation of the filter means in FIG. 1.
Figure 2:
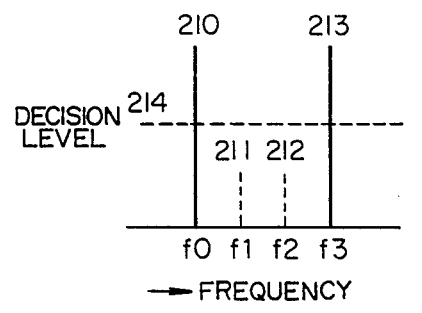
Figure 2:
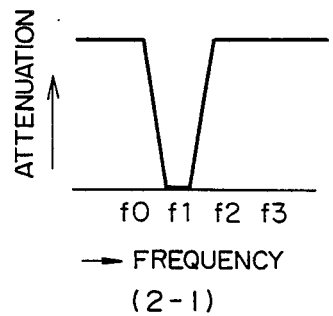
Figure 2:
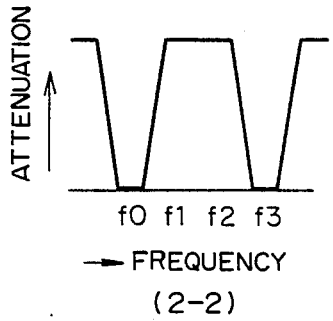

FIG. 2 is a diagram for explaining the operation of the filter sections 110 and 170 shown in FIG. 1.

Figure 3:
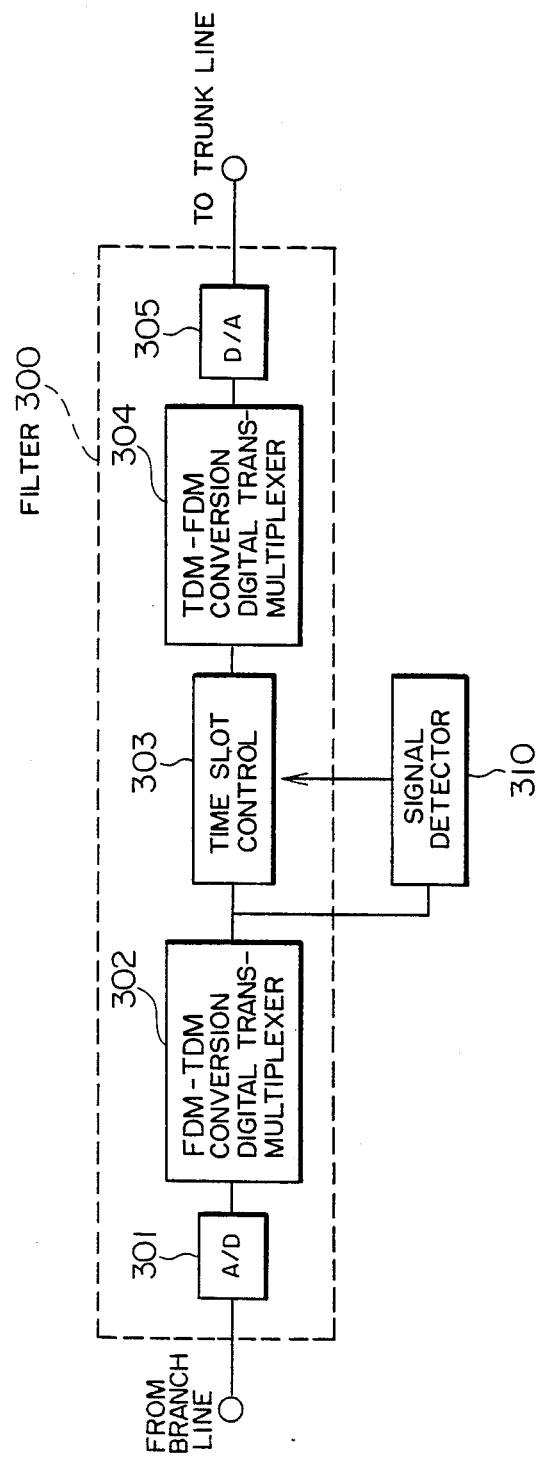
FIG. 3 is a detailed block diagram showing the filter means.

FIG. 3 is a detailed block diagram showing the filter sections 110 and 170. In FIG. 3, numeral 300 designates a filter, and numeral 310 a signal detector corresponding to the devices 111 and 112 shown in FIG. 1, respectively. The filter 300 includes an A/D converter 301, an FDM-TDM converter 302, a time slot control unit 308, a TDM-FDM converter 304, and a D/A converter 305.

Figure 4:
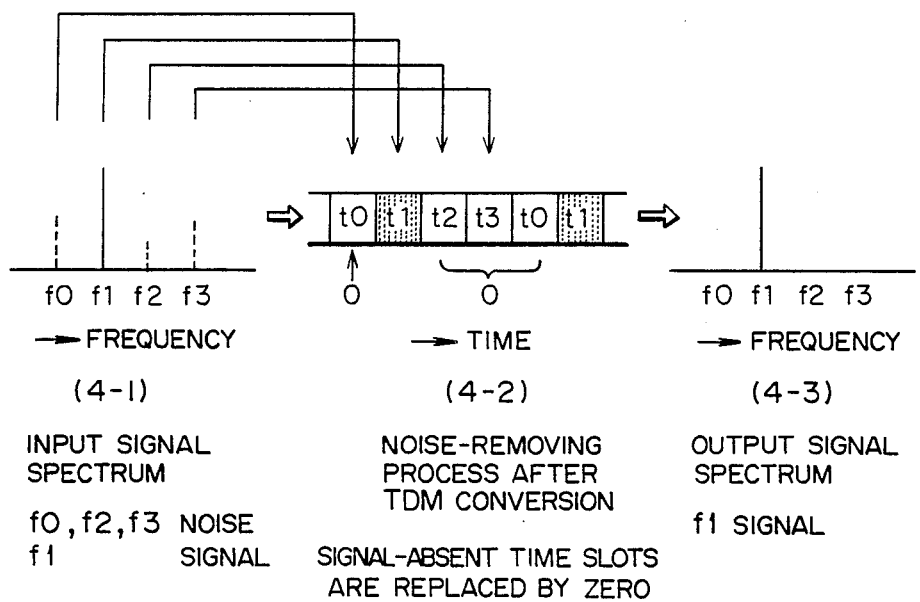
FIG. 4 is a diagram for explaining a signal processing step in FIG. 3.

FIG. 4 is a diagram for explaining the signal processing step in FIG. 3.

The FDM-TDM converter 302 and the TDM-FDM converter 304 are realized by a digital transmultiplexer using the digital signal processing.

First, an outline of the present embodiment will be explained with reference to FIGS. 1 and 2.

This embodiment uses, in an upstream communication line, frequency division multiplexing using four carrier frequencies including f0, f1, f2 and f3 arranged equidistantly (for example, a case of communicating with terminals using f0 (=35.0 MHz) for the center unit 1, f1 (=35.025 MHz) for the center unit 2, f2 (=35.05 MHz) for the center unit 3, and so on).

The signal detector 112 monitors the branch line 120 to watch in which frequency band of f0, f1, f2 or f3 a signal exists by checking whether or not a signal level exceeds a predetermined value (decision level 204, 214, and so on). The filter 111 comprises a digital transmultiplexer, as explained later, and is capable of controlling the signals in the frequency bands of f0, f1, f2 and f3 as to whether they should be allowed to pass or blocked from passing to the trunk line individually.

The filter 111 which is controlled by the signal detector 112 allows only a frequency band containing an upstream signal of the branch line 120 to pass to the trunk line. In the case where only a signal 201 of frequency f1 exists on the branch line 120, for instance, the filter 110 is controlled in the manner shown in FIG. 2(2-1), while if signals 210 and 213 of the respective frequencies f0 and f3 are present on the branch line 121, the filter 170 is controlled in the manner shown in FIG. 2(2-2).

In this way, only a frequency band containing a signal therein is connected to the trunk line, and therefore noises 200, 202 and 203, which may be present in the branch line 120, and noises 211 and 212 in the branch line 121 are prevented from flowing into the trunk line, thereby preventing the occurrence of what is called upstream noises, in which noises are produced on a plurality of branch lines and are intermixed on the trunk line.

Now, the signal processing system for the filter will be explained with reference to FIGS. 3 and 4.

A frequency multiplexed signal applied to the filter 300 from each branch line is converted into a digital signal by the A/D converter 301, and further converted into a time division multiplex signal by the FDM-TDM converter 302. The time slot control section 303 replaces the value of a time slot containing no signal with "0" in accordance with an instruction from the signal detector 310. The time division multiplex signal in a time slot, which contains no signal and whose time slot value has been replaced by zero, is again converted into a frequency division multiplex signal by the TDM-FDM converter 304, and the signal thus converted is further converted into an analog signal by the D/A converter 305 and sent out onto the trunk line.

Assume that an input signal exists only in the frequency f1 as shown in FIG. 4(4-1) with noises present in the frequencies f0, f2 and f3. The signal, which has passed the A/D converter 301 and the FDM-TDM converter 302, becomes a time division multiplex signal with the frequencies f0, f1, f2 and f3 corresponding to the time slots t0, t1, t2 and t3, respectively, as shown in FIG. 4(4-2). The signal detector 310 detects that a signal of the frequency f1 alone is present in a branch line, and hence issues an instruction to the time slot control section 303 to make the time slots other than t1 zero. The time slot control section 303 makes t0, t2 and t3 zero in accordance with the instruction from the signal detector 310. An output of the time slot control section 303 is converted again into a frequency division multiplex signal by the converter 304 as shown at (4-3) in FIG. 4, and further into an analog signal by the D/A converter 305. Since the time slots associated with noises have been made zero by the time slot control section 303, noises are eliminated from the output of the D/A converter 305 to make only a signal exist there.

In this way, passage or nonpassage of individual signals of respective frequency bands to the trunk line is controlled in the filter 300 by combining FDM-TDM conversion with TDM-FDM conversion and replacing a time slot containing no signal by zero after the conversion into a time division multiplex signal.

Although the aforementioned embodiment has been explained as having four frequency slots, the present invention is not limited in the number of frequency slots. Further, instead of detecting a signal level in order to select a time slot, instructions from the center units may be used for simplification in view of the fact that respective specific frequencies of individual terminals are under the control of the center units in many cases.

Figure 5:
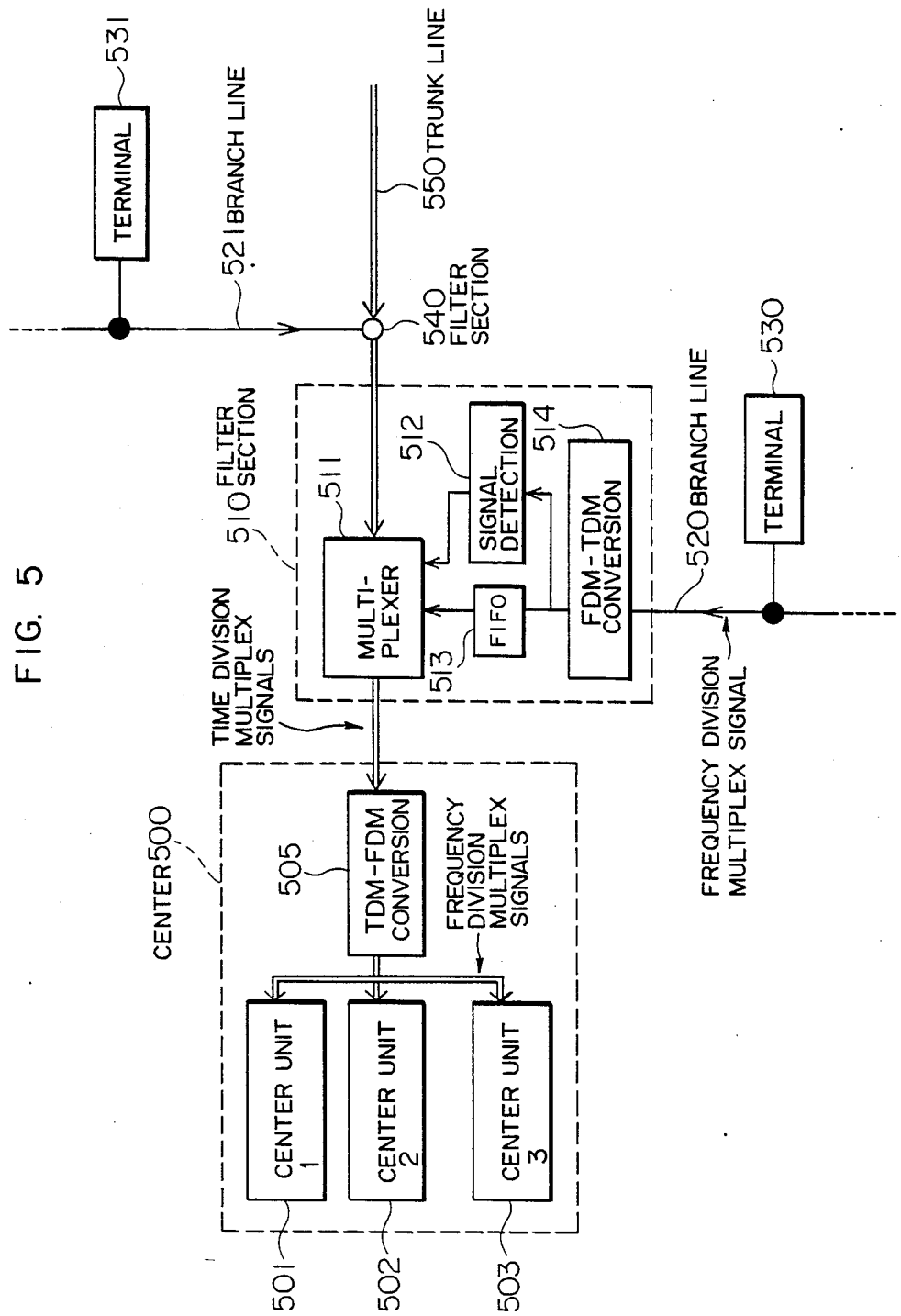
FIG. 5 is a block diagram showing a general configuration of a second embodiment of the present invention.

FIG. 5 is a block diagram showing a general configuration of a second embodiment of the present invention.

In FIG. 5, numeral 500 designates a center, numeral 550 a trunk network, numerals 510 and 540 filter sections, numerals 520 and 521 branch lines connected to the trunk line 550 at the filter sections 510 and 540, respectively, and numerals 530 and 531 terminals connected to the branch lines 520 and 521, respectively. The center 500 includes center units 501, 502 and 503 and digital transmultiplexer (TDM-FDM converter) 505. The filter section 510 includes a signal detector 512, a FIFO (first-in-first-out memory) 513, a digital transmultiplexer (FDM-TDM converter 514 and a multiplexer 511.

Figure 6:
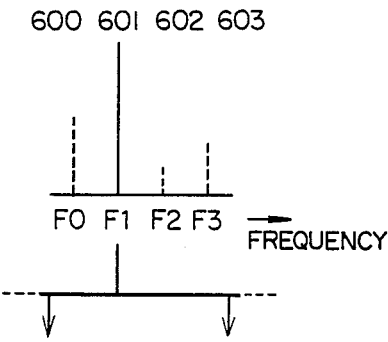
FIG. 6 is a diagram for explaining a signal processing step of the filter means and the center.
Figure 6:
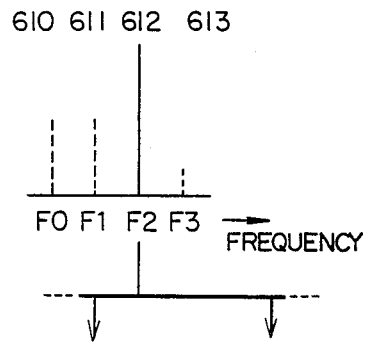
Figure 6:
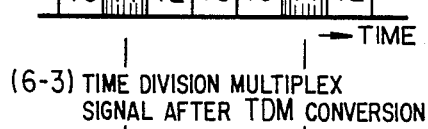
Figure 6:
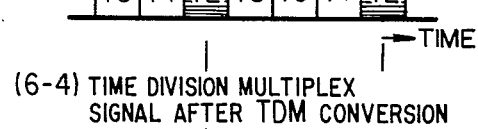
Figure 6:
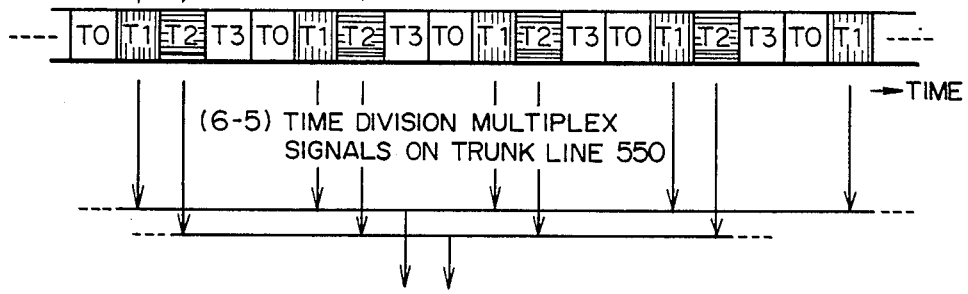
Figure 6:

FIG. 6 is a diagram for explaining the steps of signal processing in the filter sections 510 and 540 and the TDM-FDM converter 505 in the center, shown in FIG. 5.

Figure 7:
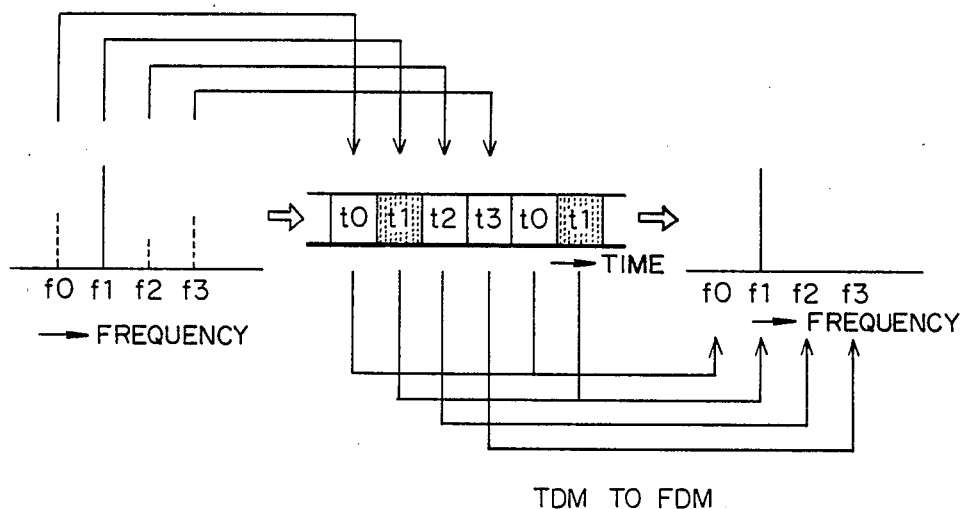
FIG. 7 is a diagram for explaining the signal processing for an FDM-TDM converter 514 and a TDM-FDM converter 505 in FIG. 5.
Figure 8:
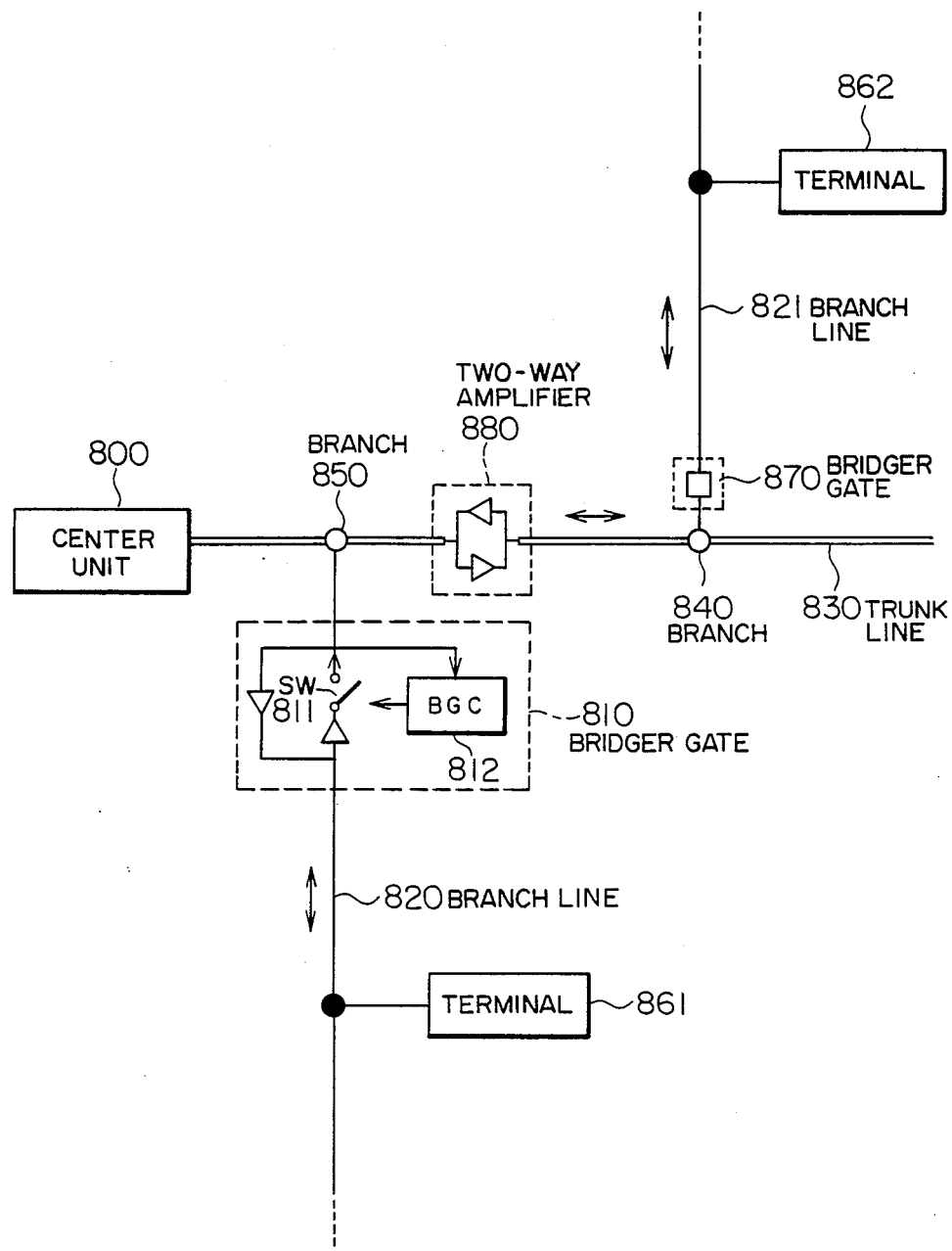
FIG. 8 is a block diagram showing a conventional system.

FIG. 7 is a schematic diagram of the signal processing in the FDM-TDM converter 514 and the TDM-FDM converter 505.

First, the operation of each device will be explained. The FDM-TDM converter 514, after having performed A/D conversion of an upstream frequency division multiplex signal transmitted along the branch line 520, converts it into a time division multiplex signal by the digital signal processing. If the terminal 530 of the branch line 520 transmits an upstream signal of the frequency f1 but the branch line 520 has no terminal, which transmits a signal, other than the terminal 530, for example, the FDM-TDM converter 514 is supplied with an input signal (an upstream signal on the branch line 520) as shown in FIG. 7(7-1). This signal is converted by the FDM-TDM converter 514 so that the frequency bands f0, f1, f2 and f3 correspond to the time slots t0, t1, t2 and t3, respectively, as shown in FIG. 7(7-2). The TDM-FDM converter 505, which operates in the exactly opposite way, converts a time division multiplex signal transmitted on the trunk line 550 into a frequency division multiplex signal by the digital signal processing, and then converts the frequency division multiplex signal into an analog frequency division multiplex signal through a D/A converter. In this way, as shown in FIG. 7(7-3), the signal is converted so that the time slots t0, t1, t2 and t3 correspond to the frequency bands f0, f1, f2 and f3, respectively.

The FIFO (first-in-first-out memory) 513 is provided to absorb a difference in timing between the time division signal on the trunk line and the time division signal produced from the FDM-TDM converter.

The signal detector 512 checks the signal level of each time slot converted into a time division multiplex signal, detects a frequency band of the branch line 520, in which an upstream signal is present, on the basis of the correspondence between the time slot and the frequency slot, and, on the basis of this result, controls the multiplexer 511 to effect multiplexing of only a time slot containing a signal in the time division signal on the trunk line.

Now, an explanation will be made of the overall signal processing principally with reference to FIG. 6.

In FIG. 5, assume that the terminals 530 and 531 of the branch lines 520 and 521 are transmitting the frequencies f1 and f2, as shown in FIGS. 6(6-1) and 6(6-2), respectively. Take the branch line 520 as an example. An input frequency multiplex signal (6-1) to the FDM-TDM converter 514 is converted into a time division multiplex signal in the FDM-TDM converter 514 so that F0, F1, F2 and F3 correspond to T0, T1, T2 and T3, as shown in FIG. 6(6-3) for example. The signal detector 512 checks the signal levels of T0, T1, T2 and T3, decides that only F1 contains a signal, and controls the multiplexer 511 so that the time slot T1 alone may be multiplexed in the time division signal on the trunk line. Also, this is exactly applicable to the branch line 521, in which case only the time slot T2 corresponding to F2 in the signals shown in FIG. 6(6-2) transmitted from the terminal 531 is multiplexed in the time division signal of the trunk line.

As a result, only those time slots, in which the time division multiplex signals on the trunk line correspond to the signals existing on the respective branch lines as shown in FIG. 6(6-5), are multiplexed, whereas the time slots T0, T2 and T3 shown in FIG. 6(6-3) and the time slots T0, T1 and T3 shown in FIG. 6(6-4) corresponding respectively to 600, 602 and 603 shown in FIG. 6(6-1) and 610, 611 and 613 shown in FIG. 6(6-2) are not multiplexed on the trunk line, so that noises are prevented from flowing into the trunk line.

In this way, an upstream signal transmitted along the trunk line 550 as a time division multiplex signal is restored to an FDM signal by the TDM-FDM converter 505 provided at the center 500, and therefore a communication line containing only minimum upstream noise can be obtained without modifying the center units 501, 502 and 503 and the terminals 530, 531 and so on.

Also, it is possible to take out respective time slots directly in the form of time division signals, as they are, without using the TDM-FDM converter 505 and to supply the time division signals to respective center units, thereby making them perform required processing.

Further, although the present invention has been described as to the communication between a central equipment and end terminal equipment, the present invention is not necessarily limited to its application to such communication between a central equipment and end terminal equipment. Instead, the present invention may be applicable to a case where the central equipment is provided with a frequency converter, whereby an upstream signal transmitted from a terminal by way of an upstream communication line is converted to have a frequency alloted to a downstream communication line, and then the resultant signal is transmitted through the downstream communication line, thereby realizing the communication between different end terminal equipment, and thus making it possible to effectively eliminate upstream noises in the upstream communication line.

I claim:

1. A two-way CATV system having a plurality of communication channels set simultaneously by using frequency division multiplexing in an upstream communication line from a plurality of terminals to a center, wherein said communication line includes a trunk line connected to the center and branch lines branching from the trunk line, said CATV system further comprises filter means including a first digital transmultiplexer for converting a frequency division multiplex signal from the terminals into a time division multiplex signal and means for sending into the trunk line only a time slot corresponding to a frequency slot containing a signal, after converting the frequency division multiplex signal from the terminals into the time division multiplex signal through said first digital transmultiplexer.

2. A two-way CATV system according to claim 1, wherein an upstream signal on the trunk line is transmitted by using time division multiplexing, said first digital transmultiplexer is disposed at each junction between the trunk line and each branch line, and said center includes a second digital transmultiplexer for converting a time division multiplex signal into a frequency division multiplex signal, whereby said CATV system operates to transmit a time slot, which has been converted and taken out through said first digital transmultiplexer, by multiplexing the time slot in a time division multiplex signal on the trunk line, and to restore time division multiplex signals to frequency division multiplex signals collectively through said second digital transmultiplexer.

3. A two-way CATV system according to claim 1, further comprising signal detection means for monitoring a level of a signal in each time slot, which signal has been converted into a time division multiplex signal through said first digital transmultiplexer, and deciding that a signal is present in a time slot upon detection of the signal in the time slot having reached a predetermined level, whereby said CATV system operates to send onto the trunk line only a time slot in which said signal detection means has decided the presence of the signal.

4. A two-way CATV system according to claim 2, further comprising signal detection means for monitoring a level of a signal in each time slot, which signal has been converted into a time division multiplex signal through said first digital transmultiplexer, and deciding that a signal is present in a time slot upon detection of the signal in the time slot having reached a predetermined level, whereby said CATV system operates to send onto the trunk line only a time slot in which said signal detection means has decided the presence of the signal.

5. A two-way CATV system according to claim 1, further comprising means for discriminating a frequency slot, which contains a signal therein, in response to an instruction of a control signal sent from the center and sending out only a corresponding time slot onto the trunk line.

6. A two-way CATV system according to claim 2, further comprising means for discriminating a frequency slot, which contains a signal therein, in response to an instruction of a control signal sent from the center and sending out only a corresponding time slot onto the trunk line.

7. A two-way CATV system having a plurality of communication channels set simultaneously by using frequency division multiplexing in an upstream communication line from a plurality of terminals to a center, wherein said communication line includes a trunk line connected to the center and branch lines branching from the trunk line, communication of an upstream signal on the trunk line is performed by using analog frequency division multiplexing, and said CATV system further comprises filter means including a first digital transmultiplexer for converting frequency division multiplex signals from the terminals into time division multiplex signals and a second digital transmultiplexer for converting time division multiplex signals into frequency division multiplex signals, and means for replacing a time slot containing no signal therein by a zero value after converting the frequency division multiplex signals from the terminals into the time division multiplex signals through said first digital transmultiplexer, then restoring the time division multiplex signals subjected to the replacement processing to the frequency division multiplex signals again through said second digital transmultiplexer, and sending out onto the trunk line the frequency division multiplex signals thus restored.

8. A two-way CATV system according to claim 7, further comprising signal detection means for monitoring a level of a signal in each time slot, which signal has been converted into a time division multiplex signal through said first digital transmultiplexer, and deciding that a signal is present in a time slot upon detection of the signal in the time slot having reached a predetermined level.

9. A two-way CATV system according to claim 7, further comprising means for discriminating a frequency slot, which contains a signal therein, in response to an instruction of a control signal sent from the center and replacing each of the time slots other than a time slot corresponding to the associated signal containing frequency slot by a zero value.

* * * * *